R. SANTORO.
SPRING WHEEL.
APPLICATION FILED MAR. 8, 1920.

1,434,067.

Patented Oct. 31, 1922.
2 SHEETS—SHEET 1.

Inventor
R. Santoro

By
N. M. Wilson
Attorney

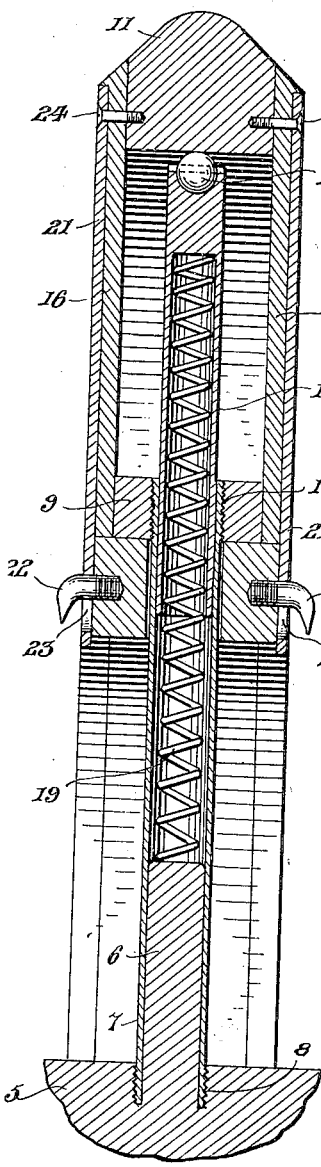
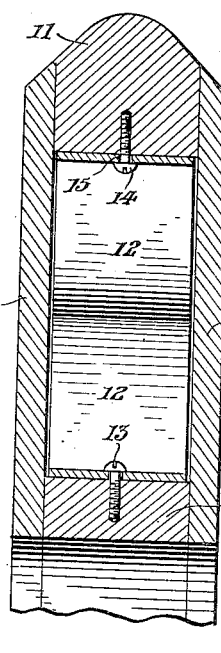
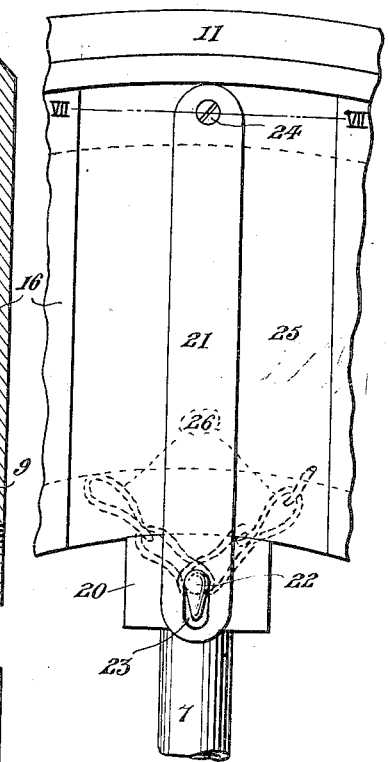
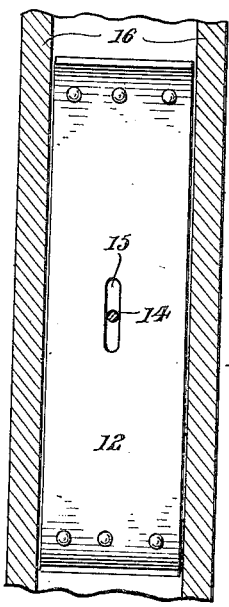

Patented Oct. 31, 1922.

1,434,067

UNITED STATES PATENT OFFICE.

RALPH SANTORO, OF HARTFORD, CONNECTICUT.

SPRING WHEEL.

Application filed March 3, 1920. Serial No. 364,124.

*To all whom it may concern:*

Be it known that I, RALPH SANTORO, a subject of the King of Italy, residing at Hartford, in the county of Hartford and State of Connecticut, have invented certain new and useful Improvements in Spring Wheels, of which the following is a specification.

This invention relates to certain new and useful improvements in spring wheels of the cushioned inner rim type particularly adapted for use upon automobiles and other vehicles so as to avoid the necessity for employing expensive pneumatic tires which are now in extensive use.

The primary object of the invention is to provide a spring wheel which is extremely simple in construction but durable and efficient in operation.

Further objects will appear as the nature of the invention is better understood, which consists in the novel form, combination and arrangement of parts hereinafter more fully described, shown in the accompanying drawings and claimed.

Figure 1:
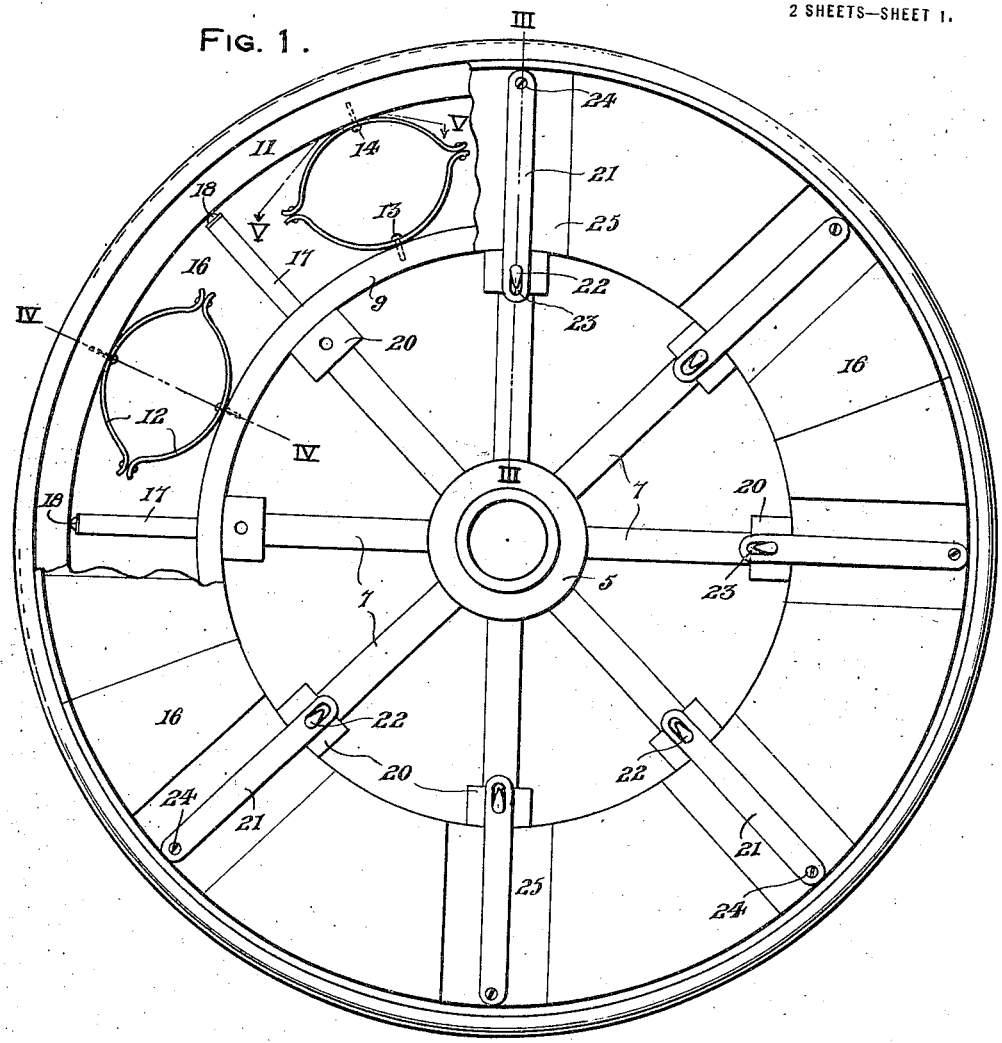
Figure 2:
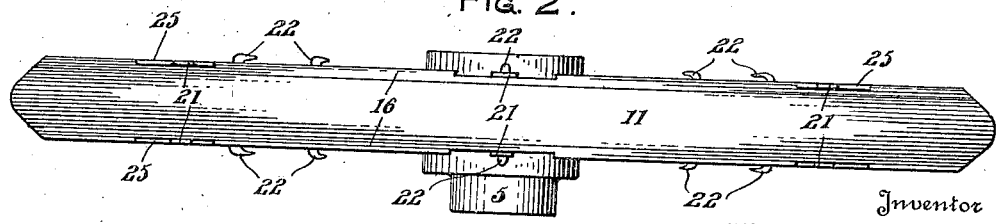

In the drawings wherein like reference characters indicate corresponding parts throughout the several views, Figure 1 is a side elevational view, partly broken away, of a vehicle wheel constructed in accordance with the present invention, Figure 2 is a top plan view thereof, Figure 3 is an enlarged sectional view taken substantially upon line III—III of Fig. 1, Figure 4 is a view similar to Fig. 3 taken upon line IV—IV of Fig. 1, Figure 5 is a fragmentary sectional detail view on an enlarged scale and taken substantially upon line V—V of Fig. 1, Figure 6 is an enlarged fragmentary side elevational view of a portion of the wheel shown in Fig. 1 to better illustrate the details of the invention, with a portion of a non skid chain indicated by dotted lines, and Figure 7 is a sectional view taken substantially upon line VII—VII of Fig. 6.

Referring more in detail to the several views, the present invention embodies the usual or any preferred form of hub 5 having radial spoke members or posts 6 rigid therewith and extending outwardly therefrom as best shown in Fig. 3 so as to provide rigid supports for the tubular spokes 7 which are slipped onto the same and which have their inner ends threaded as at 8 into the hub 5 or otherwise fastened to said hub 5.

A circular inner rim 9 is arranged about and concentric with the hub 5, and the outer ends of the tubular spokes 7 are threaded into the inner rim 9 as at 10 or otherwise rigidly fastened to said inner rim 9 coincident with apertures provided in the latter. It will thus be seen that the spoke members 6 and tubular spokes 7 form rigid connections between the hub 5 and the inner rim 9.

An outer rim 11 is arranged in spaced relation to and surrounding the inner rim 9, and the two rims 9 and 11 are yieldably maintained in concentric normal relation by suitable elliptical springs 12 or the like which are arranged at intervals entirely around the wheel between the inner and outer rims. The lower leaf of each spring 12 is centrally rigidly fastened by means of a screw 13 or the like to the inner rim 9, and the outer leaf of each spring 12 and the rim 11 may move circumferentially relative to each other, being held together by means of screws 14 or the like which pass through circumferentially elongated slots 15 provided in the outer leaf of each spring 12 and are threaded into the outer rim 11. The outer rim 11 has circular or annular guide flanges 16 secured thereto in any suitable manner, and these flanges 16 extend inwardly so as to close the space between the two rims 9 and 11 and exclude the entrance of dust between the latter, the said guide flanges 16 being in contact with the side faces of the inner rim 9 but slidable radially thereon so as to permit movement of the rims 9 and 11 radially relative to each other inwardly or outwardly.

A hollow plunger 17 is slidably disposed within each spoke 7 and has its outer end provided with a ball 18 or other suitable anti-friction member which bears against the inner surface of the outer rim 11, the plunger 17 being normally pressed outwardly of the spokes 7 by means of helical compression springs 19 which are arranged within the spokes 7 and the plungers 17 as shown in Fig. 3.

A collar 20 is slidably disposed upon each spoke 7, and each collar 20 is slidably connected to links 21 adjacent the flanges 16 by means of hook shaped bolts 22, engaging through slots 23 in the lower end of the link 21, the upper ends of the links 21 being pivotally connected to the guide flanges 16 by means of screws 24. In order to provide a neat and durable construction, the links 21 are set flush with the outer surface of the guide flanges 16 by providing the latter with radial recesses or grooves 25 within which the links 21 are positioned, the grooves 25 being of such width as to allow swinging movement of the links 21 upon their pivots 24 for such distance as is necessary in operation. By forming the outer ends of the bolts 22 in hook-shape as shown, suitable anti-skid devices may be anchored thereto when found necessary, such as the chain 26 illustrated by dotted lines in Fig. 6 of the drawings.

The links 21 form positive driving connections between the inner and outer rims of the wheel after the said rims have been allowed to move a limited distance circumferentially relative to each other by means of the pin and slot connection of the elliptical springs 12 with the outer rim and the mere contacting association of the plungers 17 with said outer rim.

In operation, the vehicle wheel is placed upon an automobile or the like in the usual manner, and, due to the load, the hub 5 is caused to move toward the ground and toward the portion of the rim 11 which contacts with the ground. This is allowed by reason of the fact that the plungers 17 can slide into the spokes 7 below the horizontal center of the wheel, and the collars 20 can slide upwardly on the spokes 7 at this point. When this takes place, the spokes which are horizontally disposed move downwardly together with the plungers 17, at which time the balls 18 roll along the inner surface of the rim 11 and the links 21 swing downwardly upon their pivots 24. There are other minute and detailed changes which take place, but these are believed to be readily apparent from the description and are not thought necessary to be mentioned herein.

It is believed that the construction and operation as well as the advantages of the present invention will be readily understood and appreciated by those skilled in the art.

Minor changes may be made without departing from the spirit and scope of the invention as claimed.

What I claim is:—

A spring wheel including a hub, an inner and an outer rim, links pivotally carried by the outer rim and slotted at their lower ends, a plurality of springs arranged between said rims, spring pressed spoke members between said outer rim and said hub, portions of the said spring spoke members rigidly connecting the inner rim and said hub in spaced relation, collars slidably positioned upon the said spring spokes and hook-shaped bolts carried by said collars engaging through the slots in said pivoted links.

In testimony whereof I affix my signature.

RALPH SANTORO.